United States Patent [19]
Simpson

[11] Patent Number: 5,954,194
[45] Date of Patent: Sep. 21, 1999

[54] GEMSTONE GIFT CARD WITH VIDEO OR AUDIO DEVICE CARRIER

[76] Inventor: William E. Simpson, 330 S. State St., Suite 293, Lake Oswego, Oreg. 97034

[21] Appl. No.: 08/988,063

[22] Filed: Dec. 10, 1997

[51] Int. Cl.[6] .................................................. B65D 85/57
[52] U.S. Cl. ....................... 206/46; 206/308.1; 206/310; 206/493
[58] Field of Search ............................. 206/308.1, 310, 206/493

[56] References Cited

U.S. PATENT DOCUMENTS

| | | |
|---|---|---|
| 4,087,576 | 5/1978 | Patterson . |
| 4,152,865 | 5/1979 | Ikeda . |
| 4,203,516 | 5/1980 | Stonoga et al. . |
| 4,433,780 | 2/1984 | Ellis . |
| 5,213,214 | 5/1993 | Stringham . |
| 5,244,085 | 9/1993 | Lammerant et al. ................... 206/310 |
| 5,284,365 | 2/1994 | Stuart . |
| 5,515,968 | 5/1996 | Taniyama ................................. 206/310 |
| 5,544,741 | 8/1996 | Fantone et al. ....................... 206/308.1 |
| 5,575,384 | 11/1996 | Saye . |
| 5,588,526 | 12/1996 | Fantone et al. ....................... 206/308.1 |
| 5,609,249 | 3/1997 | Cheng ................................... 206/308.1 |
| 5,662,218 | 9/1997 | Ladwig ..................................... 206/313 |
| 5,695,053 | 12/1997 | Koh et al. ............................. 206/308.1 |
| 5,738,221 | 4/1998 | Van Witt et al. ....................... 206/768 |

*Primary Examiner*—Paul T. Sewell
*Assistant Examiner*—Trinh Nguyen
*Attorney, Agent, or Firm*—Sixbey, Friedman, Leedom & Ferguson; Frank P. Presta; Joseph S. Presta

[57] ABSTRACT

A card device including a front card portion and a back card portion hinged together in a manner which enables the card to be opened and closed. The back card portion includes spaced front, rear and side panels which define an interior space therebetween. The card further includes a tape cartridge, such as a VHS video or audio cassette tape, having a drive gear defining an open recess in the tape cartridge, and a gift carrier device including a gift carrier portion containing a gift item, such as a gemstone. The gift carrier device and the tape cartridge are positioned in nested relation within the interior space of the back card portion such that the gift carrier portion is received within the open recess in the tape cartridge. An alternative embodiment uses a compact disk case as the card and a recess in the disk carrier for receiving the gift item.

5 Claims, 5 Drawing Sheets

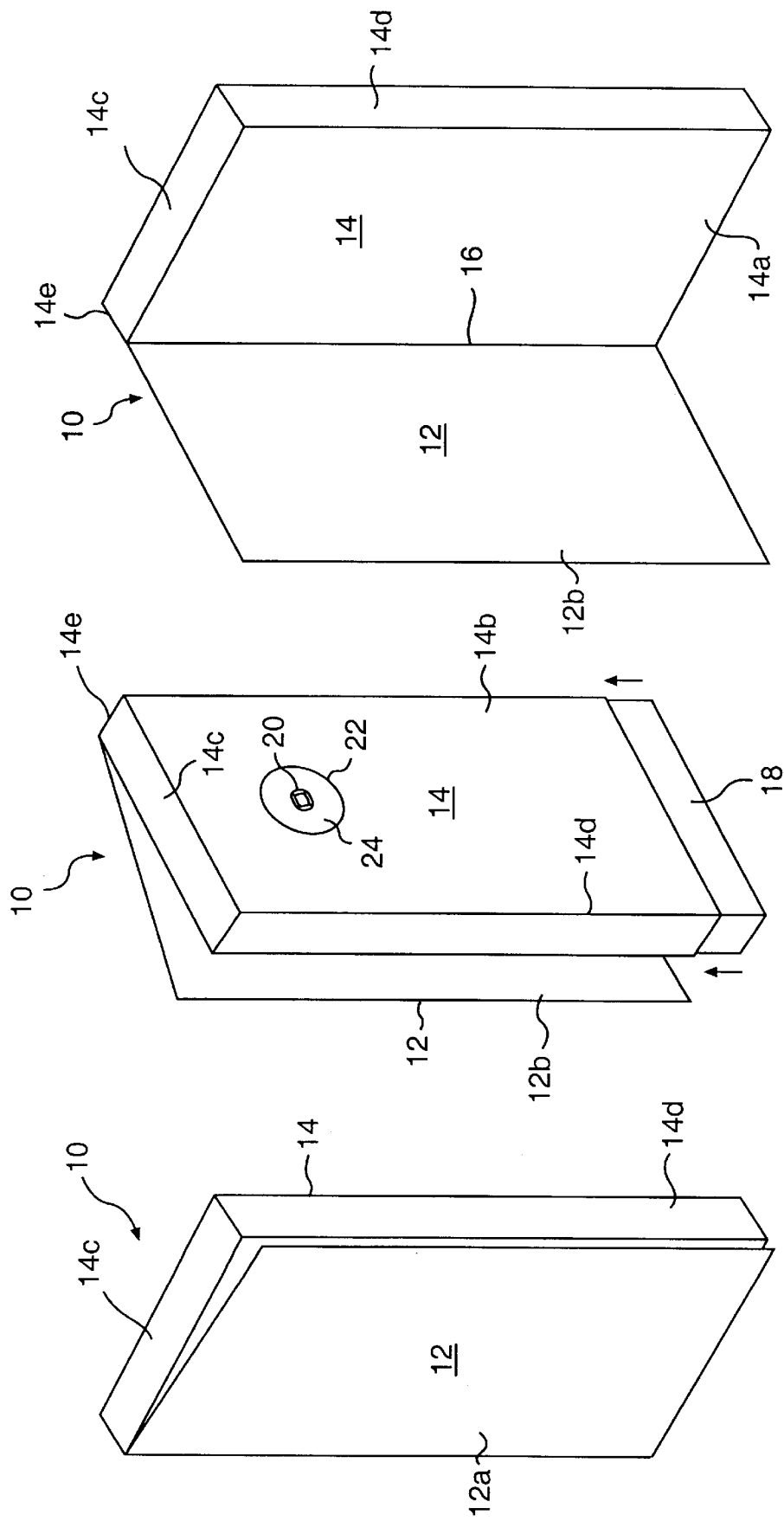

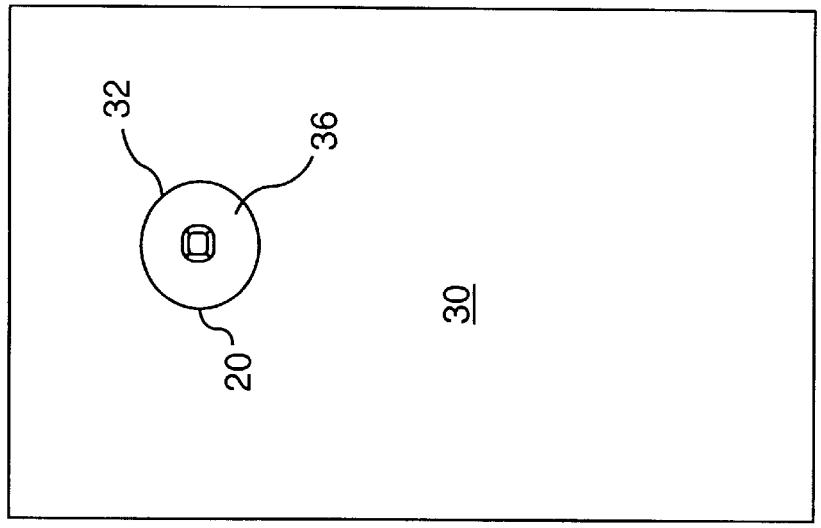
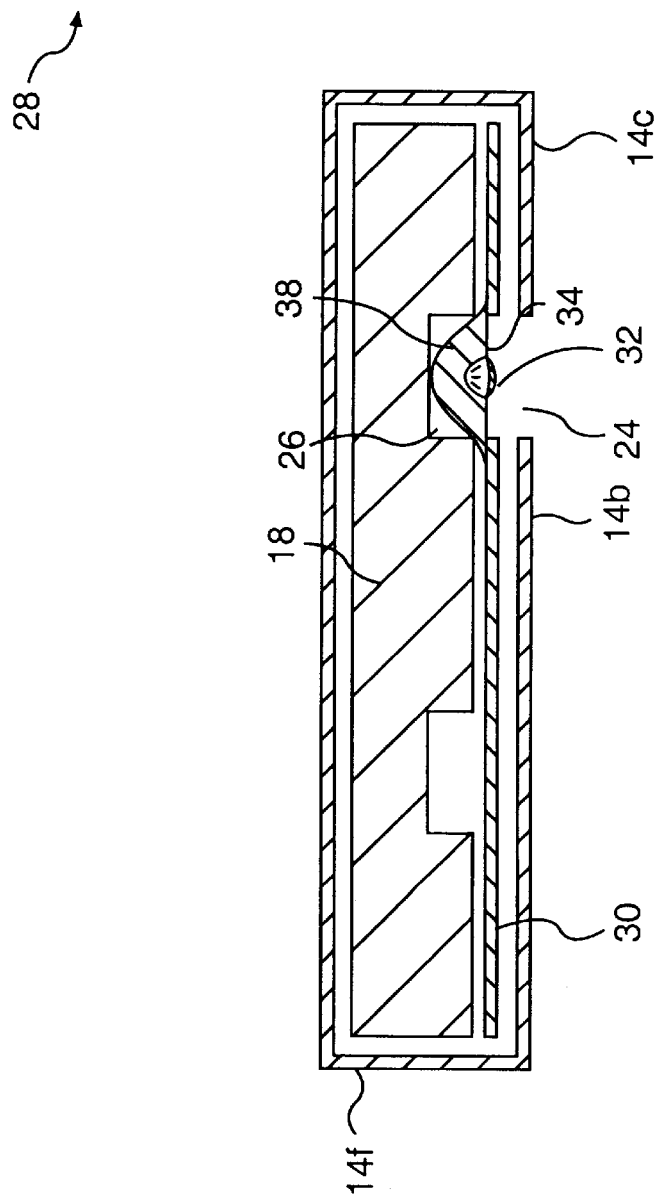
*FIG. 7*
*FIG. 8*

GEMSTONE GIFT CARD WITH VIDEO OR AUDIO DEVICE CARRIER

BACKGROUND OF THE INVENTION

The present invention relates to the field of gifts and cards, and, more particularly, to an improved card having a gemstone gift, or other item of value, contained therein in a secure and visible manner along with a video and/or audio cassette or compact disk.

In the past, numerous cards, such a greeting or special occasion cards, have been available in a variety of shapes and sizes and with a variety of different decorative images, indicia and/or messages thereon. Such cards are often purchased along with a separate gift item to be presented to the recipient of the gift as a complement to the gift. A variety of cards have also been made with means therein for holding a toy, novelty or gift item, such as a piece of candy or a dog biscuit, as evidenced by U.S Pat. Nos. 4,152,865 and 4,203,516. Cards have also been constructed in the past in a manner which enables an audio cassette to be contained therein, as evidenced by U.S. Pat. No. 4,433,780. Prior art cards, however, have not heretofore provided a card construction and configuration which enables an item of value or perceived value, such as a gemstone or simulated gemstone, to be packaged therein is a secure, visible and compact manner, along with a video and/or audio cassette or compact disk.

Thus, a need exists for an improved card which provides a means for securely and decoratively mounting a gemstone or the like therein, while also providing a carrier for an audio and/or video cassette or compact disk.

SUMMARY OF THE INVENTION

It is therefore a primary object of the present invention to provide an improved card which contains both an item of value and a video and/or audio cassette.

A further object of the present invention is to provide an improved card which is particularly adapted for securely containing a gemstone or the like.

Another object of the instant invention is to provide an improved card which enables a gemstone or the like to be displayed thereon in a decorative manner, while also preventing or deterring removal of the gemstone by an unauthorized person at the point of purchase for the card or elsewhere.

Yet another object of the instant invention is to provide an improved card containing both a video tape and a gemstone which is compact in size and can easily and inexpensively be manufactured.

A more specific object of the instant invention is to provide an improved card which takes advantage of the size and shape of a VHS video cassette contained within the card for displaying a gemstone.

A further object of the invention is to provide an improved card which constitutes a gift as well as a card.

Still another object of the invention is to provide an improved card which can be easily and inexpensively adapted to contain either a standard video or audio cassette tape and a gemstone or other relatively small item of value.

A further object of the invention is to provide an improved card which contains an item of value and a compact disk (CD).

Another object of the invention is to provide an improved card which can contain a variety of relatively small gift items, such as gemstones, and which promotes purchasers to collect a plurality of the cards.

Still another object of the invention is to provide an improved card which is particularly suited for containing a birthstone and a variety of interesting and/or educational information on the birthstone.

Yet a further object of the invention is to provide in improved card which securely maintains a gemstone in a particular visible location on the card during shipping and handling of the card.

These and other objects and advantages are achieved by the present invention, which provides a card device including a front card portion and a back card portion hinged together in a manner which enables the card to be opened and closed. The back card portion includes spaced front, rear and side panels which define an interior space therebetween. The card further includes a tape cartridge, such as a VHS video or audio cassette tape, having a drive gear defining an open recess in the tape cartridge, and a gift carrier device including a gift carrier portion containing a gift item. The gift carrier device and the tape cartridge are positioned in nested relation within the interior space of the back card portion such that the gift carrier portion is received within the open recess in the tape cartridge.

In accordance with another aspect of the invention, the rear panel or front panel of the back card portion includes a cut-out portion therein for enabling the gift item to be seen therethrough.

In accordance with another aspect of the invention, the gift item is a gemstone, and preferably a birthstone, and the tape cartridge includes information relating to the gemstone or birthstone.

In accordance with a further aspect of the invention, the gift carrier device includes transparent material defining a window which enables the gemstone to be seen therethrough, and further wherein the window is aligned with the cut-out portion in the card.

In accordance with yet another aspect of the invention, the gift carrier includes a first layer of material with a hole cut therein, transparent material positioned over the hole, and a backing device for holding the gemstone in a predetermined position against the transparent material.

In accordance with still another aspect of the invention the backing device is made of a compressible material which enables the backing device to compress around the gemstone to hold the gemstone in a stable position in the card device.

In accordance with an alternative embodiment, the invention provides a card device including a front card portion and a back card portion having an interior space, and an insert device having a first recessed portion, with an audio cassette tape received therein, and a second recessed portion. The card device further includes a gift carrier device including a gift carrier portion containing a gift item, such as a gemstone. The gift carrier device and the insert device are positioned in nested relation within the interior space such that the gift carrier portion is received within the second recess in the insert device.

In accordance with another alternative embodiment of the instant invention, the invention provides a card device including a front card portion and a back card portion hinged together in a manner which enables the card to be opened and closed and which defines a card interior therebetween. A compact disk carrier is mounted within the card interior and has a central raised portion on a front side thereof which defines an open recess in the back side thereof. The card device further includes a compact disk positioned on the front side of the disk carrier such that the central hole in the compact disk receives the raised portion on the front side thereof. The card device further includes a gift carrier device including a gift carrier portion containing a gift item, such as a gemstone. The gift carrier device and the compact disk carrier are positioned in nested relation within the interior space of the card, such that the gift carrier portion is received within the open recess in the back side of the compact disk carrier. The compact disk preferably includes audio and/or video information relating the gift item.

In accordance with another aspect of this alternative embodiment of the invention, the card device includes a conventional transparent compact disk case which defines the front card portion and the back card portion. The card device further includes sheet material with indicia for the card inserted on the inside of the front and back card portions of the card.

In accordance with still another aspect of this embodiment of the invention, the sheet material inserted in the back card portion includes a cut-out portion at a location therein which corresponds to the location of the gemstone, thereby enabling the gemstone to be seen through the back of the card device.

BRIEF DESCRIPTION OF THE DRAWINGS

Other features, objects and advantages of the subject invention will become apparent from a study of the following specification when viewed in light of the accompanying drawings, in which:

FIG. 1 shows a front perspective view of the card device of the present invention;

FIG. 2 shows a rear perspective view of the card device of the present invention with a video tape being inserted therein;

FIG. 3 shows a front perspective view of the card device of FIGS. 1 and 2 in its open position;

FIG. 7 shows a front plan view of the gemstone carrier of FIG. 5;

FIG. 8 shows a side sectional view of the nested video tape and gemstone carrier of FIG. 6 positioned within the card of FIGS. 1–3, in accordance with the present invention;

DETAILED DESCRIPTION OF THE PREFERRED EMBODIMENTS

Figure 4:
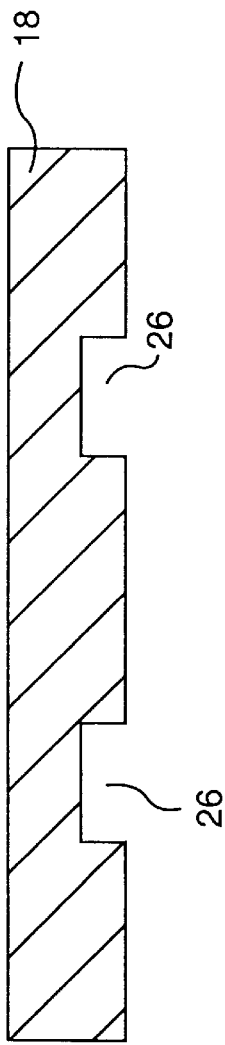
FIG. 4 shows a side sectional view of a video tape as used in one embodiment of the present invention.

Referring now to the drawings, wherein like reference numerals designate similar parts throughout the various views, and more particularly to FIGS. 1–3 thereof. The card device 10 of the instant invention includes a front portion 12 and a back portion 14 connected together along an inner edge 16, such that the front and back portions 14 and 16 cooperate to form a card structure that can be opened, as shown in FIG. 3, and closed, as shown in FIG. 1, like a conventional card. The front and back portions 12 and 14 may be made of any suitable material, such as card stock or the like.

The front portion 12 is similar to a conventional card, in that it is made of a single sheet of card stock and includes a front and back surface 12a and 12b, respectively. The back portion 14 includes a front panel 14a, back panel 14b and side panels 14e and 14d, which together define an interior space generally shaped in the form of a video and/or audio tape sleeve. The size of the card and panels can be such that the sleeve is designed to receive and hold a conventional VHS video tape 18, an audio tape or any other suitable storage medium. The back portion 14 may also include a closure panel 14f (see FIG. 8) for closing the sleeve once the video 18 is slid into the sleeve.

As seen in FIG. 2, the card device 10 is particularly designed to carry and display a gift item 20, such as a gemstone, a simulated gemstone or any other relatively small item of value or perceived value. The back portion 14b preferably includes a cut-out section 22 defining a window 24 which enables the gemstone 20 to be seen therethrough. The gemstone 20 may, for example, be approximately ¼ to ½ carat in weight.

In accordance with a first preferred embodiment of the card device 10, the back portion 14 of the card 10 is constructed to carry a standard VHS video tape 18. As shown in FIG. 4, the video tape 18 includes drive gears which define open recesses 26. As explained in more detail below, the instant invention uses at least one of the recesses 26 in an advantageous manner to secure and contain the gemstone 20 or other gift item within the card 10.

Figure 5:
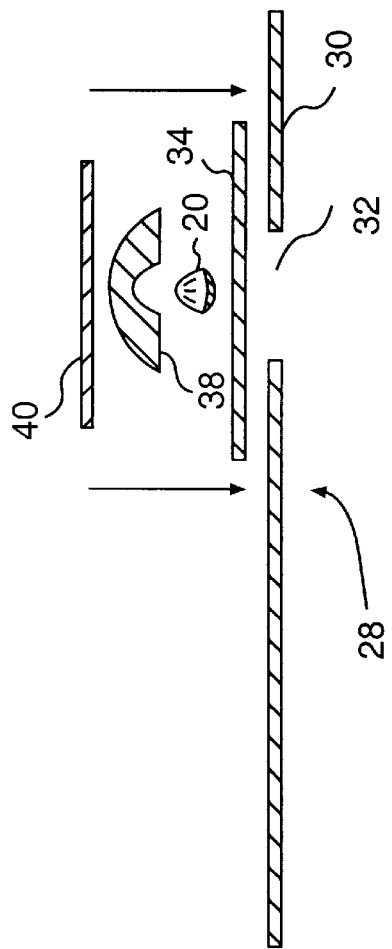
FIG. 5 shows an exploded sectional view of a preferred embodiment of the gemstone carrier of the instant invention.

The card device 10 further includes a gift item carrier 28, as shown most clearly in FIGS. 5 and 7. This carrier 28 preferably includes a first layer 30 made of suitable card stock and having a hole 32 cut therein, a second layer of transparent material 34 secured to the first layer 30 and having a size which covers the hole 32 to define a transparent window 36 for enabling the gemstone to be seen therethrough. The transparent material is preferably a durable clear plastic material, such as mylar or a material sold under the trademark Lexan, which is difficult to break, thereby deterring or preventing theft of the gemstone when the cards are displayed for sale or elsewhere. The carrier 28 further includes a backing device 38 for the gemstone 20, which holds the gemstone in its proper place and position so that it can be viewed through the window 36. The backing device 38 is preferably a size which covers the entire opening 32, so that only the gemstone and the backing can be seen through the opening 32. The backing device 38 can be glued directly to the transparent material 34 or the first layer 30, or a layer of adhesive material 40, such as tape can be used to secure the backing device 38 as part of the carrier 28. The backing device 38 is preferably a compressible material such as a foam-like material to enable the backing to be compressed around the gemstone for securely holding the gemstone in its desired position. The backing device 38 may also be constructed of colored foil or plastic material to enable a decorative display of the gemstone 20. The backing device 38 is constructed to have a size and shape which enables it and the gemstone 20 to fit into the recess 26 in the video tape 18. Alternatively, the first layer could be made entirely of a transparent material without the cut-out portion 32, thereby eliminating the need for part 34. The layer 30 preferably has a size which substantially corresponds to the size of the video tape 18, thereby helping to maintain the gemstone 20 in its proper position within the card device 10.

Figure 6:
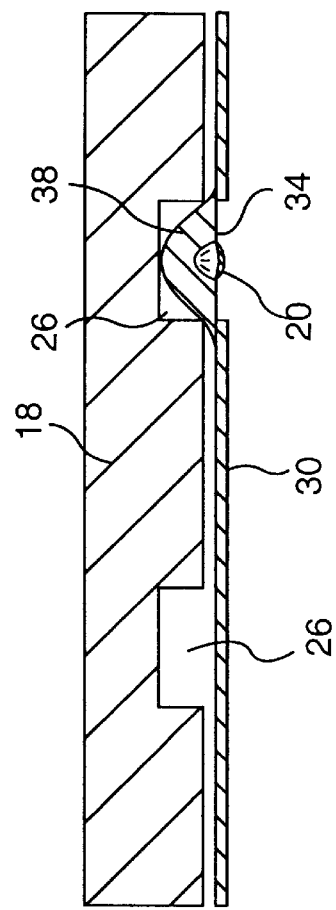
FIG. 6 shows a sectional view of the video tape and gemstone carrier of FIGS. 4 and 5 positioned in a nested configuration, in accordance with the present invention.

As can be seen in FIG. 6, the carrier device 28 is constructed to enable the portion of the carrier which carries the gemstone 20 to be inserted into the recess 26 in the audio tape, thereby enabling the tape 18 and the carrier 28 to be placed in the nested relationship shown in FIG. 6. This configuration provides a compact and convenient size for the combined tape 18 and the carrier 34 for incorporation into the card 10. If fact, this configuration provides a tape and securely mounted gemstone in a size that is hardly larger than the tape itself.

As shown in FIG. 8, the nested tape 18 and carrier 28 are together slid inside the sleeve defined by the back portion 14 of the card 10. The recess 26 in the tape, cut-out portion 32 defining the window 36 in the gift item carrier 28, and the hole 22 in the back panel 14b of the card are all aligned such that the gemstone 20 can be seen through the back of the card in a secure and decorative manner. Once assembled the card 10 provides a combination card and gift including a gemstone and a video/audio cassette.

It is noted that in the above-described embodiment an audio cassette could be used instead of a VHS tape 18, by downsizing the card 10 and using the audio cassette drive gear recess in the same manner described above for the video tape embodiment.

Figure 9:
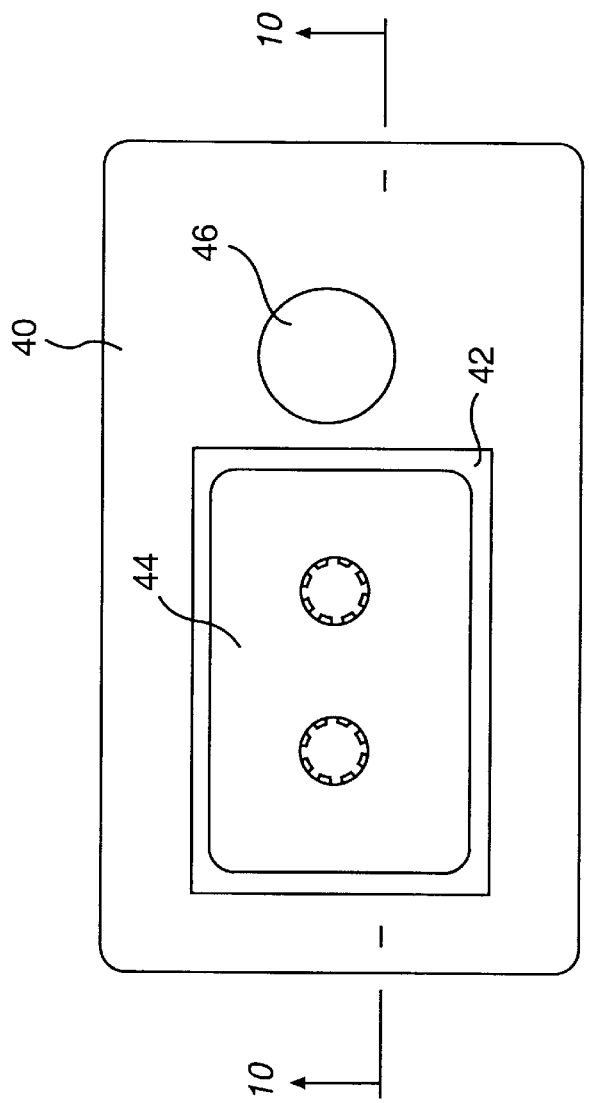
FIG. 9 shows a front plan view of an insert device used in an alternative embodiment of the present invention, wherein an audio cassette is included in the card.
Figure 10:
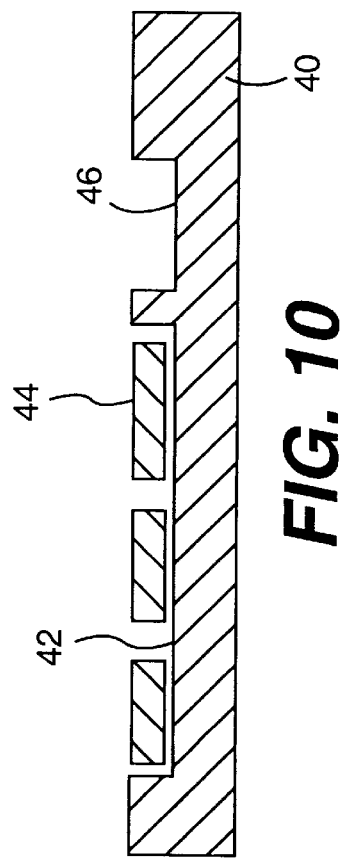
FIG. 10 is a side sectional view of the insert device along line 10—10 of FIG. 9.

An alternative embodiment designed for incorporating a standard audio tape is shown in FIGS. 9 and 10, wherein it is desired to have card 10 be substantially the same size as the VHS video tape embodiment described above. This alternative embodiment enables the same size and shape gift item carrier 28 to be interchangeably used in the video and audio tape embodiments of the invention. In this embodiment, an insert device 40 is provided for holding the audio cassette and providing a recess for the gift carrying portion of the carrier 28. The insert device 40 may be made of cardboard, recycled material, styrofoam, vacuum formed plastic, or any other suitable material. The insert device 40 includes a first recess 42 having a size and shape suitable for holding an audio cassette 44, and a second recess 46 have a size, shape and location which substantially corresponds to and simulates the video tape drive gear recess 26 in the first embodiment described above. This enables the gift item carrier 28 to be nested with the insert device 40, in the same manner as in the video tape embodiment, prior to being slid into the sleeve of the card 10.

The video tape 18 and audio tape 44 preferably contain information which relates to the gift item. For example, if the gift item is a gemstone, the information on the tape may provide specific information about the gemstone. The tape could also include a customizable portion which includes a personalized massage with the card, thereby enabling the purchaser of the card to place a personalized message for the recipient of the card on the tape. In a more specific embodiment, the card is a birthday card and the gift is a birthstone. A set of twelve such cards can be made each being tailored to one of the twelve months of the year and containing a specific birthstone for each month, respectively. Each card can be color coordinated to the color of the birthstone and may include a detailed photograph or drawing of the birthstone on the front cover 12a thereof. Information and decorative indicia may also be printed in any suitable location on the card. For example, the card could include a picture of a birthflower corresponding to the birthstone, information on an interesting event occurring in that month or an interesting person born in that month, and/or information on the stone itself, including famous examples of the stone, hardness, care and cleaning instructions, or any other desired information. The card may also include a portion for enabling the purchaser to provide a personalized written message on the card. The tape may include even more detailed information relating to the gemstone. The recipient of the card 10 can remove the tape and the gift item carrier and have the option of removing the stone and using it in a piece of jewelry. As a result of the design of the instant invention, the gemstone and tape can be removed from the card without damaging the card.

Figure 11:
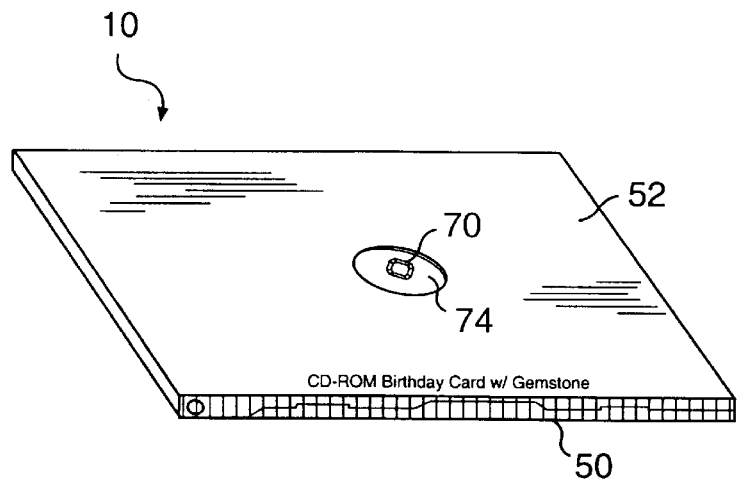
FIG. 11 shows another alternative embodiment of the present invention wherein a compact disk and compact disk case are used.
Figure 12:
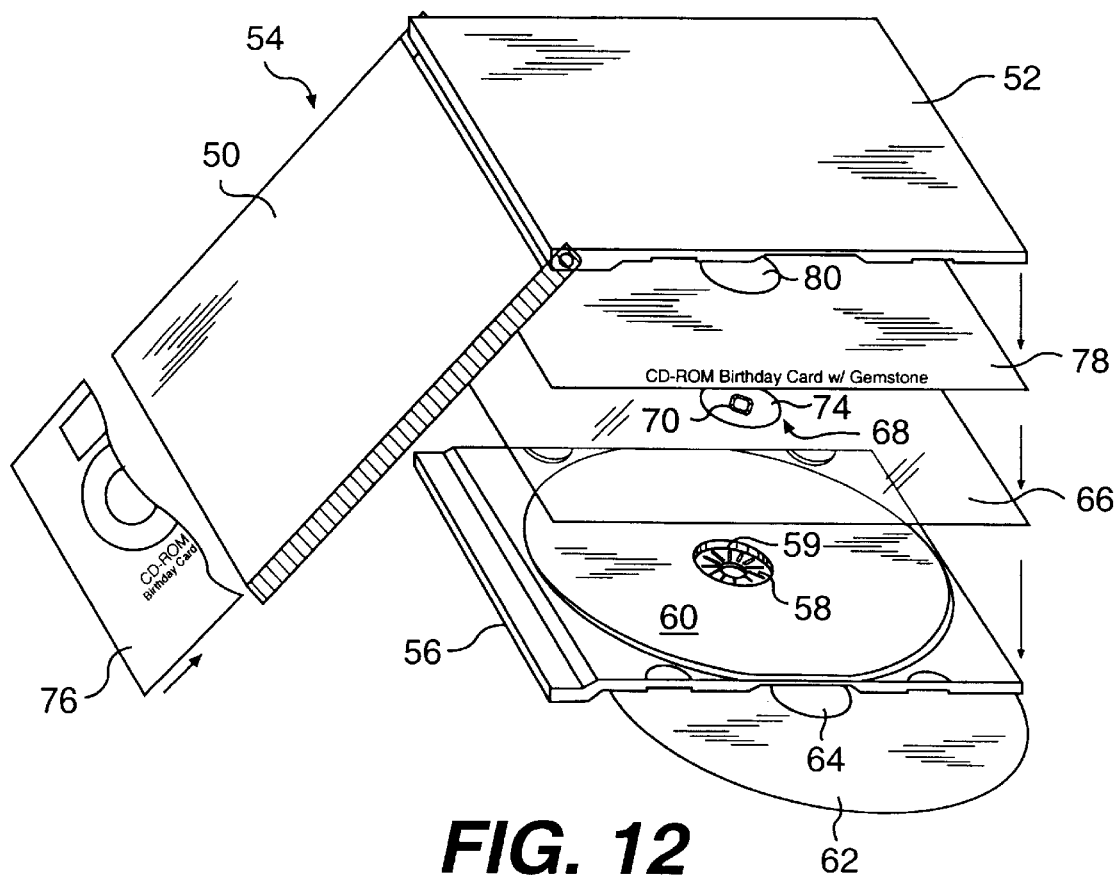
FIG. 12 shows an exploded view of the embodiment of the instant invention shown in FIG. 11.

An alternative embodiment of the instant card device 10 is shown in FIGS. 11 and 12. This embodiment is particularly adapted for incorporating a compact disk (CD), or other similarly shaped storage medium, in the card instead of a video or audio tape. The compact disk may be a CD Rom, an interactive CD, recordable CD, a digital video disk (DVD), or any other similar type of storage medium. This embodiment includes a front card portion 50 and a back card portion 52 which are hinged together in a manner which enables the card 10 to be opened and closed. Preferably, the front and back portion constitute a conventional compact disk case 54, sometimes known and a "jewel case" or "CD box". However, any other suitably designed case 54 can be used. The case 54 has an interior space when closed. Inside the case 54 is a compact disk carrier 56 mounted within the card interior and having a central raised portion 58 on a front side thereof. The raised portion on the front side defines an open recess 59 on the back side 60 of the disk carrier 56. The card 10 further includes a compact disk 62 positioned on the front side of the compact disk carrier 56, such that the central hole 64 on the compact disk receives the raised portion 58 on the front side of the disk carrier 56. The card 10 further includes a gift item carrier device 66 including a gift carrier portion 68 containing a gift item 70, such as a gemstone or birthstone. The gift carrier device 66 is preferably constructed in the manner described above with respect the embodiment shown in FIG. 5, wherein a transparent window 74 is provided behind which the gemstone 70 is mounted with a suitable backing device or layer. The gift carrier device 66 has a size and shape which enables it and the compact disk carrier 56 to be positioned in nested relation within the interior space of the card 10. More particularly, the gift carrier portion 68 is received within the open recess 59 in the back side 60 of the compact disk carrier 56. In other words, the recess 59 in the disk carrier is used in the same manner as the drive gear recess 26 in the video tape embodiment described above.

Preferably, the card case 54 is made of transparent material, and the card additionally includes a piece of sheet material 76 and 78, such as paper or card stock, inserted on the inside of the front card portion 50 and the inside of the back card portion 52, such that the sheets can be seen through the transparent case 54. The sheet 78 inside the back card portion 52 preferably contains a hole 80 therein for enabling the gemstone 70 to be seen therethrough. In the same manner explained above, the sheet material can include printed information or decorative indicia, to provide a birthday card or the like. The sheet 78 and gift item carrier 66 may alternatively be constructed as a single element. The compact disk 62 preferably includes the same type of information as explained above with respect to the audio and video tape 18 and 44.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

What is claimed is:

1. A card device, comprising a front card portion and a back card portion hingedly connected together in a manner which enables said card to be opened and closed, said front card portion and said back card portion defining a card interior therebetween, a compact disk carrier mounted within said card interior and having a central raised portion on a front side thereof, said raised portion defining an open recess in a back side of said compact disk carrier, said card device further including a compact disk positioned on the front side of said compact disk carrier such that a central hole on said compact disk receives said raised portion on said front side thereof, said card device further including a gift carrier device including a gift carrier portion containing a gift item, said gift carrier device and said compact disk carrier being in nested relation within said card interior, wherein said gift carrier portion is received within said open recess in said back side of said compact disk carrier.

2. A card device as define in claim 1, wherein said card device includes a conventional transparent compact disk case which defines said front card portion and said back card portion, and further including sheet material inserted on an inside of said front card portion and said back card portion, said sheet material including indicia for the card.

3. A card device as defined in claim 1, wherein said gift item is a gemstone.

4. A card device as defined in claim 2, wherein said sheet material inserted in said back card portion includes a cut-out portion at a location therein which corresponds to the location of the gift item to enable the gift item to be seen through said cut-out portion.

5. A card device as define in claim 4, wherein said gift carrier device includes transparent material defining a window which enables said gift item to be seen therethrough, and further wherein said window is aligned with said cut-out portion.

\* \* \* \* \*